(12) United States Patent
Diaz

(10) Patent No.: US 6,618,245 B2
(45) Date of Patent: Sep. 9, 2003

(54) ACCESS DOOR ASSEMBLY FOR A COMPUTER CASE

(75) Inventor: Elizabeth B. Diaz, Woodside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/774,594

(22) Filed: Feb. 1, 2001

(65) Prior Publication Data

US 2002/0101710 A1 Aug. 1, 2002

(51) Int. Cl.[7] .................................................. G06F 1/16
(52) U.S. Cl. ..................... 361/685; 361/683; 312/223.2; 312/223.1; 248/65
(58) Field of Search ................................. 361/685, 683, 361/684, 724–727; 312/223.1, 223.2, 222; 248/65, 73, 534, 535

(56) References Cited

U.S. PATENT DOCUMENTS

| 5,572,402 | A | * | 11/1996 | Jeong ........................... 361/685 |
| 5,701,231 | A | * | 12/1997 | Do et al. ...................... 361/683 |
| 5,924,780 | A | * | 7/1999 | Ammon et al. ........... 312/223.2 |
| 5,967,633 | A | * | 10/1999 | Jung ......................... 312/223.2 |
| 6,049,449 | A | * | 4/2000 | Cranston, III et al. ...... 361/683 |
| 6,132,019 | A | * | 10/2000 | Kim et al. ................ 312/223.2 |
| D441,746 | S | * | 5/2001 | Doczy et al. ............... D14/349 |
| 6,377,447 | B1 | * | 4/2002 | Boe ............................. 361/685 |
| 6,407,910 | B1 | * | 6/2002 | Diaz et al. ................... 361/683 |

* cited by examiner

Primary Examiner—Darren Schuberg
Assistant Examiner—Yean-Hsi Chang

(57) ABSTRACT

The present invention is directed to an access door assembly for a computer case in which a drive door can be easily opened, thereby allowing access to the module data storage media drive which is connected to the removable door. Advantageously, the use of an access door which is easily opened facilitates upgrade and/or maintenance and repair of the removable media drive. The media drive can be, for example, a floppy disc drive or a hard disc drive. Because of the ease of use, the access door can be opened by a person without any technical skill, thereby lowering warranty costs. Maintenance and upgrades can be done by an unskilled consumer without the necessity of either having to ship the computer back to the manufacturer or have a service technician visit the consumer.

18 Claims, 5 Drawing Sheets

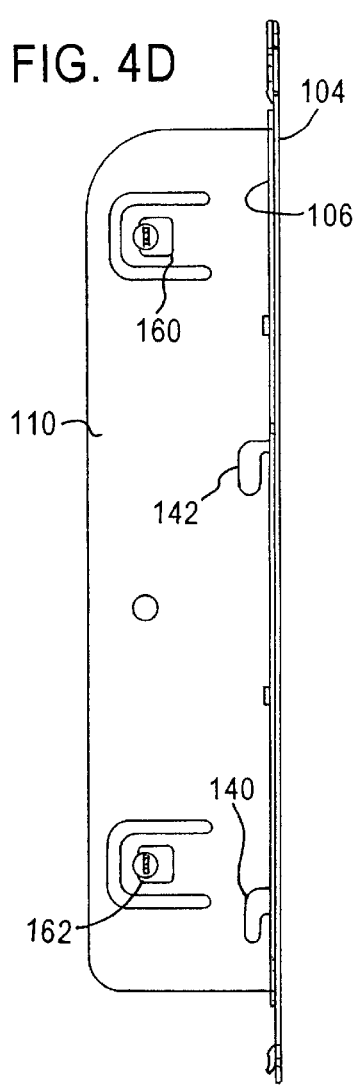
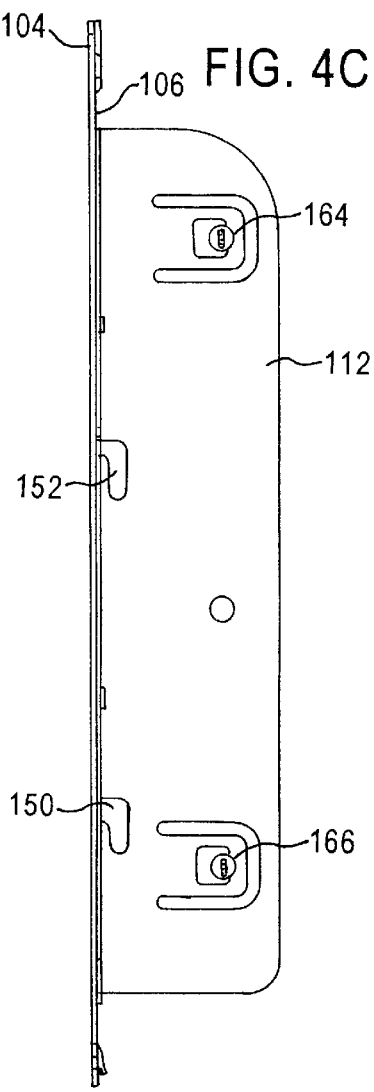
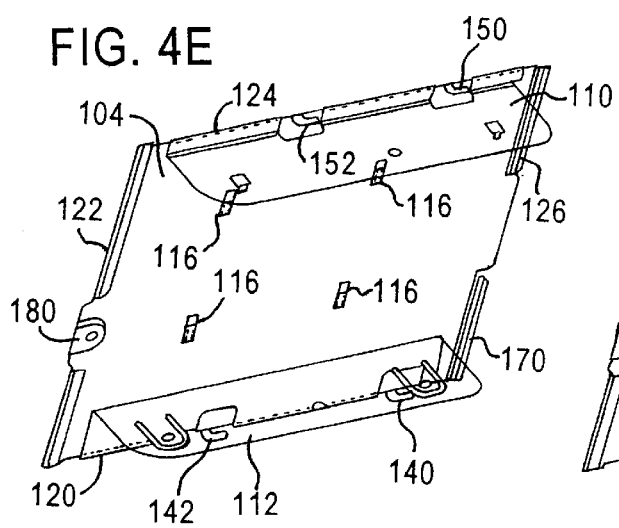
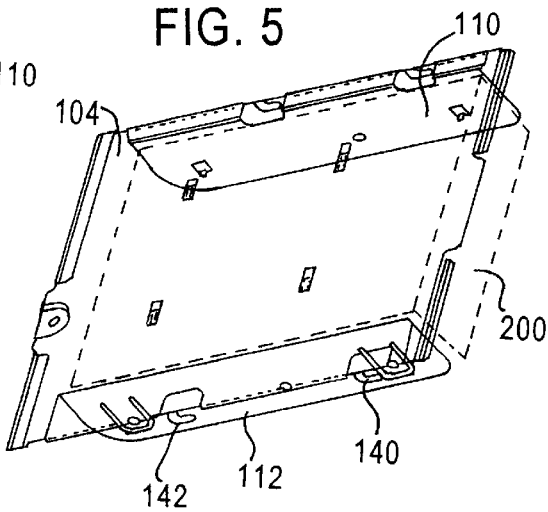

ACCESS DOOR ASSEMBLY FOR A COMPUTER CASE

FIELD OF THE INVENTION

The present invention relates generally to personal computers and, more particularly, to a computer provided with an access door for a modular data storage media drive. Even more particularly, the present invention relates to a computer in a tower configuration provided with an access door for a modular data storage media drive.

BACKGROUND OF THE INVENTION

Personal computers have become smaller and smaller. One common configuration which reduces the footprint of a computer is a computer having a tower configuration. A tower computer has a relatively small width and relatively larger height and length dimensions.

Because of the reduced size of the newer personal computers, it is necessary to pack the components into a smaller space. However, the more tightly packed the components are, the more difficult it is to assemble and disassemble a computer. For example, it is difficult for a computer owner or repair person to perform warranty repair work if the computer configuration does not provide easy access to various components which may require maintenance or replacement during the life of the computer. In densely packed housings, it is often necessary to go through the tedious process of removing one or more components using special tools and techniques in order to gain access to the component which must be tested or replaced. This can be extremely expensive for the computer manufacturer in the event that a modular data storage media drive needs to be tested or replaced. In the event that the drive needs to be tested or replaced it may be necessary to either ship the computer case to a repair facility or have a computer technical personally go to repair the disabled computer.

Thus, a need exists for an apparatus and method which allows a modular data storage media drive to be easily replaced or upgraded, maintained and repaired without requiring the computer to be shipped to a repair facility and without having to have a computer technician go to an on-site location to test and/or repair the disabled computer.

SUMMARY OF THE INVENTION

An object of the present invention is to provide an access door assembly for a computer case which allows a modular data storage media drive to be easily replaced and/or upgraded in the field.

Another object of the present invention is to provide a computer housing having an access door assembly which can be easily opened and the drive easily removed and replaced.

A further object of the present invention is to provide an access door assembly which allows a modular data storage media drive to be easily replaced or upgraded, maintained and repaired without requiring the computer to be shipped to a repair facility and without having to have a computer technician go to an on-site location to test and/or repair the disabled computer.

Another object of the present invention is to reduce warranty and/or repair costs for modular data storage media drives which have to be replaced.

The present invention is directed to an access door assembly for a computer case in which the access door can be easily opened, thereby allowing access to a module data storage media drive which is connected to the removable door. Advantageously, the use of an access door which is easily opened facilitates upgrade and/or maintenance and repair of the removable media drive. The media drive can be, for example, a floppy disc drive or a hard disc drive. Because of the ease of use, the access door can be opened by a person without any technical skill, thereby lowering warranty costs. Maintenance and upgrades can be done by an unskilled consumer without the necessity of either having to ship the computer back to the manufacturer or have a service technician do an on-site visit to the consumer.

These and other objects of the present invention are achieved by an access door assembly for a computer case. The computer case has an opening sized to accommodate the drive door assembly. A drive door is attachable to the computer case of a size corresponding to the opening. A media drive is connected to the drive door.

The foregoing and other objects of the present invention are achieved by a method of attaching a removable drive door assembly which includes a drive door and a media drive attached to the drive door to a computer case. The computer case has an opening in an exterior wall sized to accommodate the drive door. The drive door has a plurality of ramps and the opening has a plurality of slots which includes positioning the plurality of the ramps in the recesses and moves the ramps in a longitudinal direction such that the ramps engage an inner wall of the computer case.

The foregoing and other objects of the present invention are achieved by a computer case assembly. The computer case has an opening that is generally rectangular with a plurality of recesses extending outwardly from the opening. A drive door assembly includes a drive door attachable to the computer case. The drive door is of a size corresponding to the openings. The drive door has a plurality of ramps. A media drive is connected to the drive door.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 4C is a side elevational view of the access door of FIG. 4A;

FIG. 4D is a left side view of the access door of FIG. 4A;

FIG. 4E is a perspective view of the access door according to the present invention; and FIG. 5 is a perspective view of the access door including a modular data storage media drive attached to the access door.

BEST MODE FOR CARRYING OUT THE INVENTION

Figure 1:
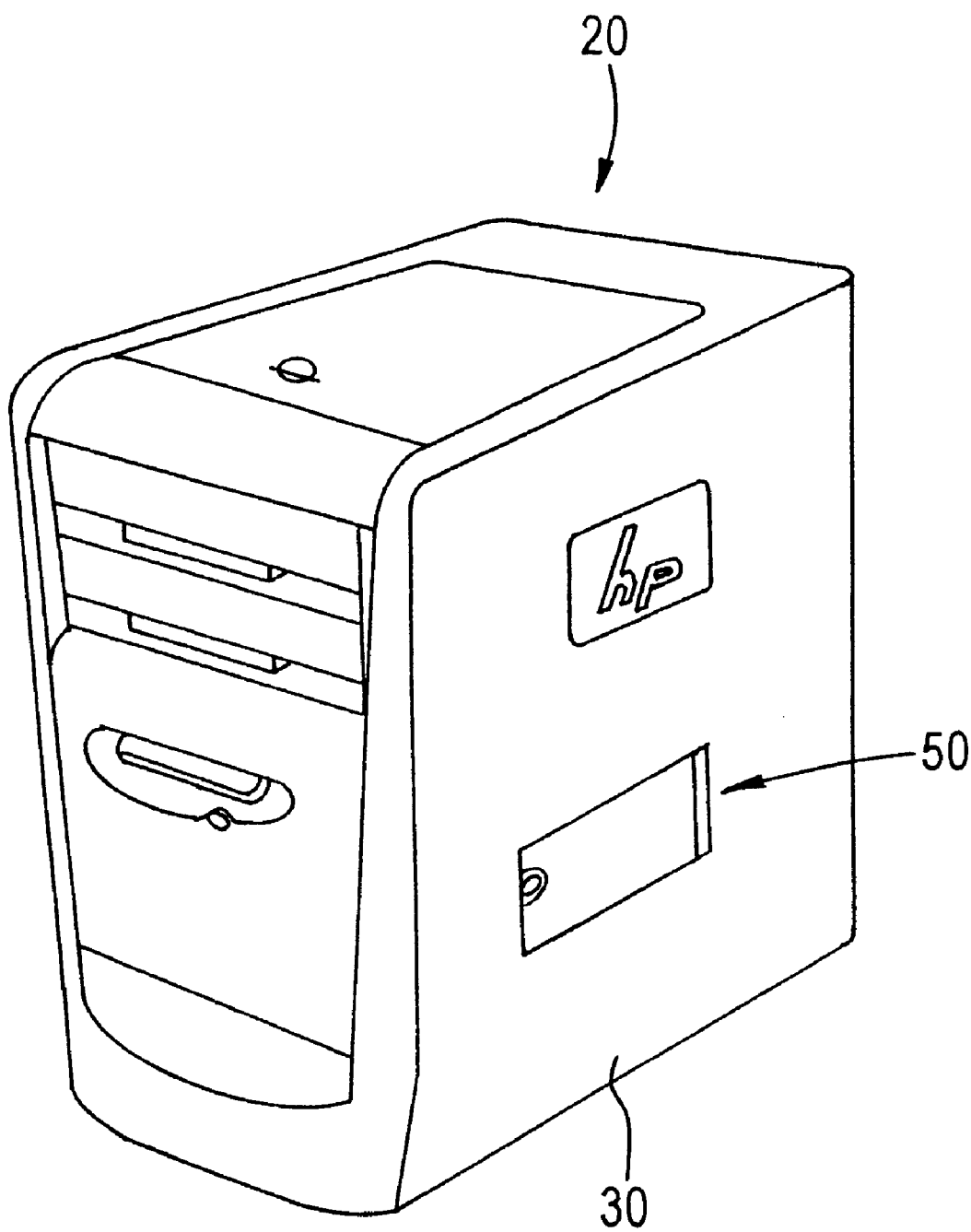
FIG. 1 is a perspective view of a computer case illustrating the access door in a closed position.

Refer now to FIG. 1 where a computer case, generally indicated at 20, is illustrated. The computer case 20 is illustrated in a tower configuration and includes a sidewall 30 which includes an access door assembly, generally indicated at 50, according to the present invention. It should be understood that the present invention is equally applicable to any computer case configuration and is particularly applicable in configurations where the size of the computer case has been minimized or reduced. Also, although the access door assembly is depicted in a horizontal configuration, it is also usable in a vertical configuration. As depicted in FIG. 1, the access door assembly 50 is illustrated in a closed position.

Figure 2:
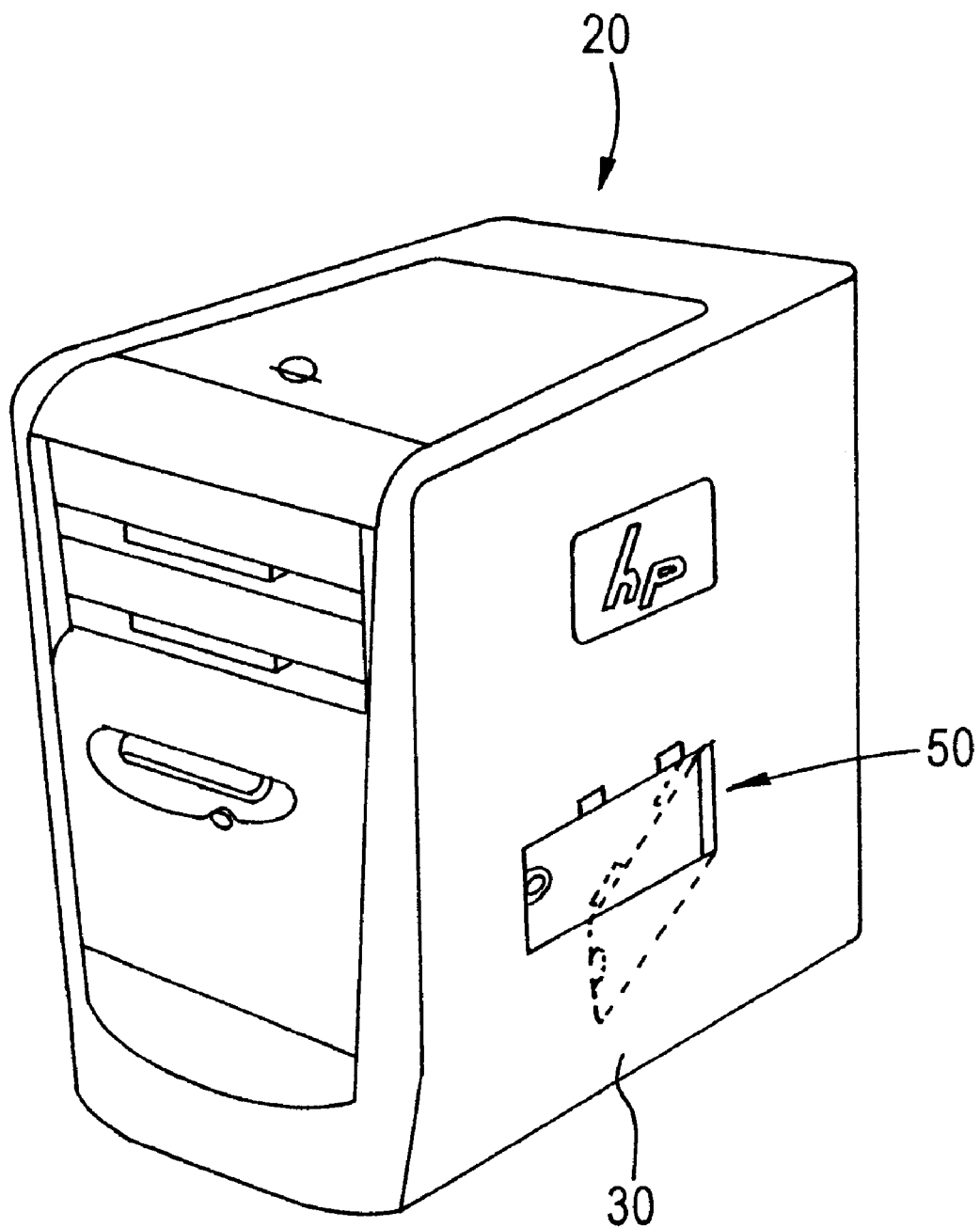
FIG. 2 is a perspective view showing the access door in dashed lines in an open position.

Refer now to FIG. 2 wherein the access door assembly 50 is depicted in an open position in dashed lines. The access door assembly 50 has been pivoted in a counter clockwise direction away from the sidewall 30 as shown in FIG. 2.

Figure 3:
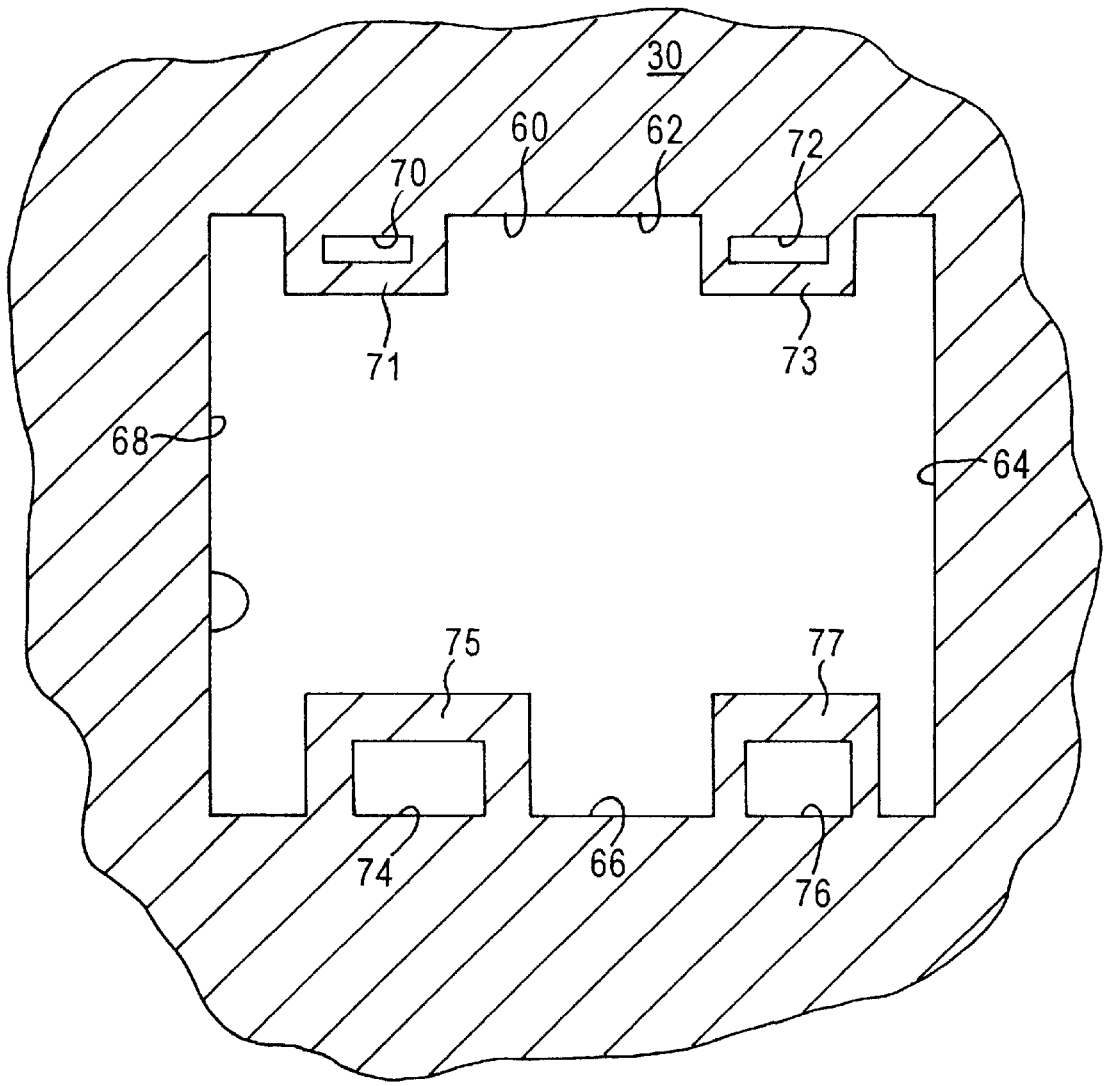
FIG. 3 is an enlarged view of an opening in the computer case into which the access door is positioned.
Figure 4A:
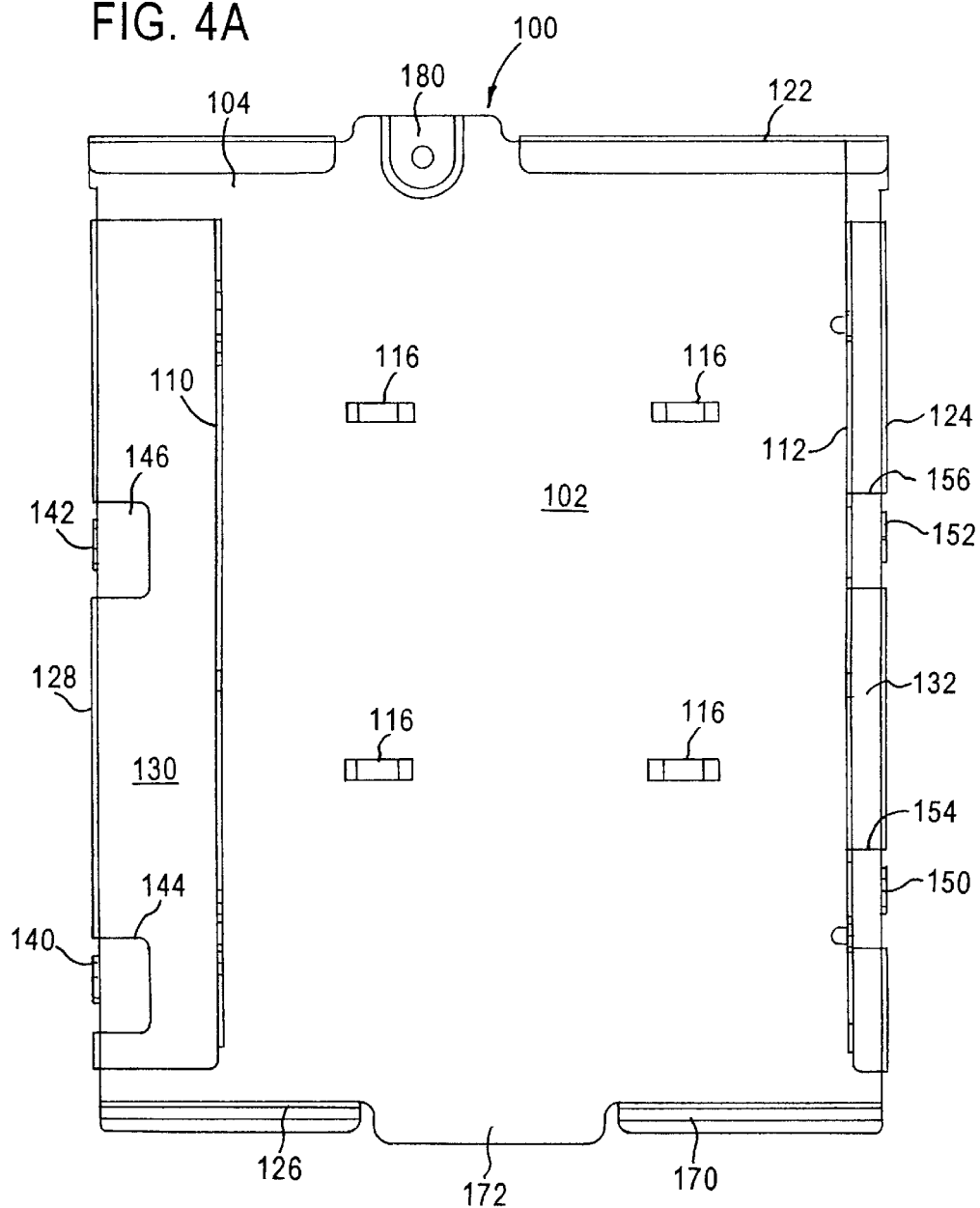
FIG. 4A is a top plan view of the access door according to the present invention.
Figure 4B:
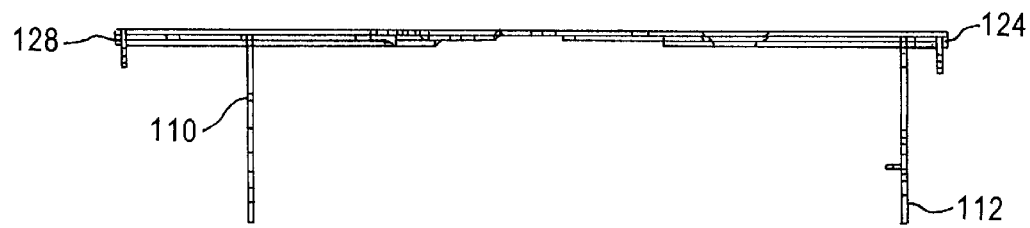
FIG. 4B is an end view of the access door according to the present invention.

Refer now to FIG. 3 where an enlarged view of an opening 60 formed in the side panel 30 is illustrated. The access door assembly 50 is positioned in the opening. 60. The opening 60 has a generally rectangular configuration with four edges 62, 64, 66 68. Two elongated slots 70, 72 are formed in cut out portions 71, 73 respectively which extend inwardly from wall edge 62 and parallel thereto and each has a rectangular shape. Extending inwardly from the wall edge 66 are two elongated slots 74, 76, respectively. Slots 74, 76 extend inwardly from wall edge 66 further than slots 70, 72 extend from wall edges 60, 62. Slots 70, 72 are directly opposite and the same length as slots 74, 76 although the slots can be of any length. The slots 74, 76 are parallel to the wall edge 66.

Refer now to FIGS. 4A–4E. An access doors generally indicated at 100., used in the access door assembly 50 is illustrated according to the present invention. The access door 100 includes an enclosure portion 102 that is generally flat and has an outer surface 104 and an inner surface 106. The outer surface 104 is so constructed that it will be generally flush with the outer surface of the side panel 30 when the door assembly 50 is in the closed position as depicted in FIG. 1. Extending from surface 106 is a first wall 110 and a second wall 112. A plurality of vents 116 are formed in the enclosure portion 102 to allow for ventilation and to space the media drive 200 from the inner surface 106 of the enclosure portion 102. Enclosure portion 102 has peripheral edges 120, 122, 124, 126. Preferably, the access door 100 is a one piece stamping.

A first set of L-shaped ramps 140, 142 are formed which extend from edge 128 inwardly towards wall 110. Ramps 140, 142 extend downwardly from surface 106 to engage with an inner surface of the side panel 30. Similarly, a second set of ramps 150, 152 extend from the edge 124 and from surface 106. Further, in walls 110 and 112, there are formed locking tabs 160, 162, 164, 166 which are formed by forming U-shaped cut outs in walls 110, 112, respectively. In this manner, tabs 160–166 can be bent inwardly to retain a modular media drive such as a floppy disk drive or a hard disk drive.

A downwardly extending lip 170 is positioned outwardly from the edge 126. Downwardly extending lip 170 is separated into two sub portions by an outwardly extending portion 172. In this manner, the outwardly extending portion 172 will be located on an outer surface of the side panel 30 whereas downward extending sub-lips 170 will be located on an inner surface of the side panel 30 when the drive door 100 is disposed in a closed position. A fastener area 180 is located proximate to edge 122.

The drive door 100 is preferably formed as a single piece stamping with the walls 110 and 112 being bent transversely relative to the enclosure portion 102. The walls 110 and 112 are connected to the edges 128, 124, respectively by connecting portions 130, 132, respectively which are bent back onto the inner surface 106. The ramps 140, 142 are formed by forming cut outs 144, 146, respectively in the connecting portion 130 and then bending the ramps 140, 142 transverse relative to the enclosure portion 102. The ramps 150, 152 are formed by forming cut outs 154, 156 in the connecting portion 132 and then bending the ramps 150, 152 transverse relative to the enclosure portion 102.

As depicted in FIG. 5, a modular media drive 200 is depicted attached to drive door 100 via the locking tabs 160–166. For simplicity, cables connecting the media drive 200 to the PC board are omitted for clarity.

In operation, the media drive 200 would first be either attached or removed from the drive door 100. The cables would either be attached or detached depending on whether a media drive was being installed or removed. To install the drive door assembly 50 in the closed position depicted in FIG. 1, the access door assembly 50 would be positioned in recess 60 with tab 152 located in the slot 70, the tab 150 located in the slot 72, the tab 142 located in the slot 74, and the tab 140 located in the slot 76, respectively. Once the tabs 152, 150, 142, 140 are properly located in each of the slots, as depicted in FIG. 1, the access door assembly 50 would be moved to the right such that the ramps 150, 152, 140, 142 would engage an inner surface of the side panel 30. A fastener can then be used in fastener area 180 to secure the drive door assembly 100 to the side panel 30 in a known manner.

It should be appreciated with the media drive 20 positioned in the access door shown in FIG. 1 or 2 or entirely removed from the computer case as shown in FIG. 5 that the entire media drive is easily accessible. Thus, a user may quickly and easily upgrade and/or repair the media drive without using special tools and without technical skills or training. Similarly, a technician can easily access the interior of the computer case by opening the access door. In the illustrated embodiment, it is only necessary to remove a fastener from the side of the access door; open the door by pivoting it in the direction shown in FIG. 2 and, if necessary, remove cables from the media drive. The entire operation can typically be performed by a person with no technical experience who has recently performed the same operation at least once before, in less than three minutes. Thus, the entire removable media drive is readily accessible. The phrase "readily accessible" when used herein to refer to a computer component such as a media drive means that unobstructed access may be obtained so that computer component by an average person, with no technical experience who recently performed the same operation at least once before, in less than three minutes and without using special tools.

It will be appreciated that providing a computer case with a drive door assembly having a media drive, such as a floppy disc drive or a hard disc drive, such as described above, provides many benefits to both a user and to a computer service department. For example, if a user desires to have work performed on a defective hard drive, the user can easily remove it and ship it to a repair site without going through the considerable trouble of packing and shipping the entire computer. Furthermore, the individual may be able to continue to use their computer without the hard drive if the user has other drives. Another benefit is that a computer operator who requires service to another portion of its computer may remove and retain the hard drive before shipping the computer and thus retain control over the hard drive and possibly sensitive data contained thereon. Also, the user may use the removable hard drive in the same manner that a computer user uses removal in the media. For example, a computer which is shared by multiple users, each user might own and retain their own hard drive which the user manually installs at the beginning of an operating session. Removable hard drive is, of course, of great benefit to a repair facility which may easily replace a defective hard drive to the user, possibly while the user waits. The easily removable hard drive reduces labor time associated with hard drive repair or warranty service and thus is beneficial to the computer servicer as well as the computer user.

It should now be appreciated that a computer case and access door have been described which are very compact and allow the tower computer to occupy a relatively small foot print on a desk top. However, the manner in which the components are mounted in the computer allows easy access to the floppy drive and/or hard disk drive of the computer even in a relatively compact configuration. The floppy drive and hard drive can each be modular components each mounted on their own access door, thereby allowing easy removal and replacement/repair/inspection of these components. This access door also allows ready access to the interior of the computer case.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A door assembly, adapted to be attached to a wall of a computer case having a plurality of walls that define an inside space of said computer case, and, when so attached, substantially covering an opening in said wall of said computer case, said door assembly comprising:

a substantially flat plate, comprising an inwardly directed surface and an outwardly directed surface, wherein said inwardly directed surface is adapted to be directed toward said inside space of said computer case when said door is attached to said wall, wherein said door is adapted to be completely detachably attached to said wall in closing association with said opening, and wherein said flat plate is of a size that at least covers said opening when said door is attached to said wall;

means to detachably connect a media drive to said door proximate to an inwardly directed surface of said substantially flat plate such that when said door is attached to said wall and is in a closed position covering at least said opening, said media drive is contained within said inside space;

means on said inwardly directed surface of said substantially flat plate to space said media drive, from said flat plate; and at least one substantially "L" shaped ramp(s) extending away from said inwardly directed surface of said substantially flat plate, wherein said "L" shaped ramp(s) is/are adapted to be directed toward said inside space of said computer ease when said door is in a closed position;

wherein a first leg of said "L" is attached to and extends from said inwardly directed surface, and a second leg of said "L" is attached to and extends from said first leg in a direction transverse to said first leg whereby defining a space between said inwardly directed surface and said second leg;

wherein said ramp(s) is/are adapted to be inserted into a corresponding number of recesses in said wall spaced from said opening and adapted to slidingly engage at least one corresponding, substantially flat surface of said wall proximate to said recess(es); and wherein said door is adapted to be placed over said opening with said ramp(s) in said whereby engaging said "L" shaped ramp(s) with said substantially flat surface in a recess(es) and is adapted to be slid in a direction that is substantially parallel to said wall whereby engaging said "L" shaped ramp(s) with said substantially flat surface in a disengageable, substantially locking, relationship.

2. The door assembly of claim 1, wherein the door further comprises a first wall and a second wall spaced from said first wall and extending away from and transverse to said inwardly directed surface wherein said first and second walls are adapted to disengagingly engage said media drive.

3. The drive door assembly of claim 2, wherein the computer case opening is generally rectangular with a plurality of recesses extending outwardly from said opening.

4. The door assembly of claim 1, further comprising fastener means for further releasably attaching said door assembly to said computer case.

5. The drive door assembly of claim 3, wherein each of said recesses is longer than each of the corresponding ramp portions.

6. The drive door assembly of claim 3, wherein some of said plurality of recesses extend outwardly from said opening a first distance and others of said plurality of recesses extend outwardly from said opening a second distance.

7. The door assembly of claim 1, wherein said media drive is one selected from a floppy disk drive and a hard disk drive.

8. A method of attaching at least one completely removable drive door assembly to at least one of a plurality of exterior walls of a computer case; wherein said wall to which said door assembly is adapted to be attached comprises:

an opening therein adapted to provide access to an interior space within said case; and a plurality of recesses proximate to said opening and defining substantially flat portions of said wall that are accessible from said opening; wherein said door assembly comprises:

a substantially flat plate having an inwardly directed side and an outwardly directed side and having at least one "L" shaped ramp extending from said inwardly directed side; and means to attach a media drive to the door assembly;

said method comprising:

positioning said flat plate over said opening such that said ramp(s) are disposed in a corresponding number of said recesses and said flat plate is substantially parallel to said wall; and slidingly moving the door in a direction that is substantially parallel to said wall such that said ramps disengagingly engage a corresponding flat portion of said wall of said computer case that is proximate to said recess(es);

whereby fastening said door to said computer case and causing said media drive to be enclosed within said inner space.

9. The method of claim 8, further comprising fastening said door to said wall of said computer case at a position remote from said recesses.

10. The method of claim 8, wherein said flat plate has at least one lip extending from a side thereof in a plane that is parallel to, but not coincident with, the plane of said flat plate, and wherein said method further comprises positioning said lip under said wall when said door is disposed over said opening in such position that it is inside said wall and inside the computer case, and engaging said lip under a proximate portion of said wall when said door is slidingly engaged to said wall.

11. A computer case assembly comprising:

a plurality of walls defining a space inside said computer case;

at least one opening occupying a portion of one of said walls;

at least one recess in said wall spaced from, but proximate to, said opening;

a media drive; and a door assembly as claimed in claim 1 detachably attached to said wall;

wherein said "L" shaped ramp(s) is/are disposed within corresponding ones of said recess(es) in a slidingly locked relationship with said corresponding substantially flat surface(s);

wherein said substantially flat plate substantially covers said opening; and wherein said media drive is detachably attached to said door assembly proximate to said inwardly directed surface thereof.

12. The computer case of claim 11, wherein the computer case is a tower computer case.

13. The computer case of claim 11, further comprising said access door comprising inwardly directed first and second walls extending transverse and inwardly extending with respect to, said inwardly directed surface of said substantially flat plate, and a plurality of ramp portions projecting from said substantially flat plate and engaged with said computer case wall.

14. The computer case of claim 11, further comprising fastener means for releasably attaching said drive door assembly to the computer case.

15. The computer case of claim 4, further comprising attachment means for attaching said media drive to said drive door.

16. The computer case of claim 11, wherein each of said recesses is longer than each of the corresponding "L" shaped ramp portions.

17. The computer case of claim 11, wherein some of said plurality of recesses extend outwardly from said opening a first distance and others of said plurality of recesses extend outwardly from said opening a second distance.

18. The computer case of claim 11, wherein said media drive is at least one member selected from the group consisting of a floppy disk drive and a hard disk drive.

* * * * *